(12) United States Patent
Dick et al.

(10) Patent No.: US 7,979,533 B2
(45) Date of Patent: *Jul. 12, 2011

(54) SYSTEM, METHOD AND COMPUTER PROGRAM PRODUCT FOR AUDITING XML MESSAGES IN A NETWORK-BASED MESSAGE STREAM

(75) Inventors: Kevin Stewart Dick, Palo Alto, CA (US); Eric Kenneth Rescorla, Mountain View, CA (US)

(73) Assignee: Network Resonance, Inc., Palo Alto, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 11/549,880

(22) Filed: Oct. 16, 2006

(65) Prior Publication Data

US 2008/0091821 A1 Apr. 17, 2008

Related U.S. Application Data

(63) Continuation of application No. 09/861,264, filed on May 18, 2001, now Pat. No. 7,124,299.

(51) Int. Cl.
*G06F 15/173* (2006.01)
(52) U.S. Cl. ........ 709/224; 713/178; 713/168; 713/170; 715/511; 370/390; 709/223
(58) Field of Classification Search .................. 707/104, 707/10
See application file for complete search history.

(56) References Cited

U.S. PATENT DOCUMENTS

| | | | |
|---|---|---|---|
| 4,625,076 A | 11/1986 | Okamoto et al. |
| 4,868,877 A | 9/1989 | Fischer |
| 4,881,264 A | 11/1989 | Merkle |
| 5,136,646 A | 8/1992 | Haber et al. |
| 5,136,647 A | 8/1992 | Haber et al. |
| 5,235,642 A | 8/1993 | Wobber et al. |
| 5,373,561 A | 12/1994 | Haber et al. |
| RE34,954 E | 5/1995 | Haber et al. |
| 5,533,021 A | 7/1996 | Branstad et al. |
| 5,615,109 A | 3/1997 | Eder |
| 5,640,456 A | 6/1997 | Adams, Jr. et al. |
| 5,671,364 A | 9/1997 | Turk et al. |
| 5,691,917 A | 11/1997 | Harrison |
| 5,781,629 A | 7/1998 | Haber et al. |

(Continued)

FOREIGN PATENT DOCUMENTS

EP 0786883 A1 7/1997

(Continued)

OTHER PUBLICATIONS

Vasudevan, A Web Services Primer, Apr. 4 2001, XML.com, p. 3.*

(Continued)

*Primary Examiner* — Ashok B Patel
*Assistant Examiner* — Andrew Goldberg
(74) *Attorney, Agent, or Firm* — Cooley LLP; Vidya R. Bhakar, Esq.

(57) ABSTRACT

A system, method and computer program product for auditing a message in a message stream are disclosed. Messages in a message stream are captured including at least one message in an extensible markup language (XML) format. Each message in the XML format is then extracted from the captured messages and has a timestamp applied thereto. Each timestamped message in the XML format is then stored in a memory.

9 Claims, 7 Drawing Sheets

U.S. PATENT DOCUMENTS

| | | | |
|---|---|---|---|
| 5,781,729 A | | 7/1998 | Baker et al. |
| 5,799,016 A | | 8/1998 | Onweller |
| 5,835,726 A | * | 11/1998 | Shwed et al. ................. 709/229 |
| 5,878,218 A | * | 3/1999 | Maddalozzo et al. ........ 709/213 |
| 5,917,911 A | | 6/1999 | Dabbish et al. |
| 5,925,108 A | | 7/1999 | Johnson et al. |
| 6,012,098 A | | 1/2000 | Bayeh et al. |
| 6,021,397 A | | 2/2000 | Jones et al. |
| 6,032,193 A | | 2/2000 | Sullivan |
| 6,034,956 A | | 3/2000 | Olnowich et al. |
| 6,067,288 A | | 5/2000 | Miller et al. |
| 6,075,796 A | | 6/2000 | Katseff |
| 6,076,071 A | | 6/2000 | Freeny, Jr. et al. |
| 6,118,936 A | | 9/2000 | Lauer et al. |
| 6,144,945 A | | 11/2000 | Garg et al. |
| 6,148,290 A | | 11/2000 | Dan et al. |
| 6,167,448 A | | 12/2000 | Hemphill et al. |
| 6,178,244 B1 | | 1/2001 | Takeda et al. |
| 6,212,190 B1 | | 4/2001 | Mulligan |
| 6,236,972 B1 | | 5/2001 | Shkedy |
| 6,246,771 B1 | | 6/2001 | Stanton et al. |
| 6,289,451 B1 | * | 9/2001 | Dice ............................. 713/168 |
| 6,314,402 B1 | | 11/2001 | Monaco et al. |
| 6,351,467 B1 | * | 2/2002 | Dillon ........................... 370/432 |
| 6,363,477 B1 | * | 3/2002 | Fletcher et al. ............... 713/151 |
| 6,381,344 B1 | | 4/2002 | Smithies et al. |
| 6,393,102 B1 | | 5/2002 | Drew et al. |
| 6,401,074 B1 | | 6/2002 | Sleeper |
| 6,405,179 B1 | | 6/2002 | Rebane |
| 6,405,212 B1 | | 6/2002 | Samu et al. |
| 6,408,404 B1 | | 6/2002 | Ladwig |
| 6,456,986 B1 | | 9/2002 | Boardman et al. |
| 6,484,203 B1 | | 11/2002 | Porras et al. |
| 6,490,292 B1 | | 12/2002 | Matsuzawa |
| 6,539,392 B1 | | 3/2003 | Rebane |
| 6,643,652 B2 | | 11/2003 | Helgeson et al. |
| 6,662,192 B1 | | 12/2003 | Rebane |
| 6,697,809 B2 | | 2/2004 | Chen et al. |
| 6,714,979 B1 | | 3/2004 | Brandt et al. |
| 6,724,933 B1 | | 4/2004 | Lin et al. |
| 6,732,102 B1 | | 5/2004 | Khandekar |
| 6,732,153 B1 | | 5/2004 | Jakobson et al. |
| 6,742,119 B1 | | 5/2004 | Peyravian et al. |
| 6,766,368 B1 | | 7/2004 | Jakobson et al. |
| 6,772,216 B1 | | 8/2004 | Ankireddipally et al. |
| 6,785,682 B2 | | 8/2004 | Todd |
| 6,826,405 B2 | | 11/2004 | Doviak et al. |
| 6,826,582 B1 | | 11/2004 | Chatterjee et al. |
| 6,941,557 B1 | | 9/2005 | Jakobson et al. |
| 7,010,478 B2 | | 3/2006 | Mathur et al. |
| 7,051,071 B2 | | 5/2006 | Stewart et al. |
| 7,069,335 B1 | | 6/2006 | Layman et al. |
| 7,162,448 B2 | | 1/2007 | Madoff et al. |
| 2001/0021252 A1 | | 9/2001 | Carter et al. |
| 2002/0016964 A1 | | 2/2002 | Aratani et al. |
| 2002/0023221 A1 | | 2/2002 | Miyazaki et al. |
| 2002/0032865 A1 | | 3/2002 | Golubchik et al. |
| 2002/0035606 A1 | | 3/2002 | Kenton |
| 2002/0056091 A1 | | 5/2002 | Bala et al. |
| 2002/0072951 A1 | | 6/2002 | Lee et al. |
| 2002/0078384 A1 | | 6/2002 | Hippelainen |
| 2002/0080958 A1 | | 6/2002 | Ober et al. |
| 2002/0091605 A1 | | 7/2002 | Labe et al. |
| 2002/0120711 A1 | | 8/2002 | Bantz et al. |
| 2002/0120850 A1 | * | 8/2002 | Walker et al. ................. 713/178 |
| 2002/0138744 A1 | | 9/2002 | Schleicher et al. |
| 2002/0174218 A1 | | 11/2002 | Dick et al. |
| 2002/0174340 A1 | | 11/2002 | Dick et al. |
| 2003/0021275 A1 | | 1/2003 | Shabeer |
| 2003/0028468 A1 | | 2/2003 | Wong et al. |
| 2003/0120939 A1 | | 6/2003 | Hughes et al. |
| 2003/0126435 A1 | | 7/2003 | Mizell et al. |
| 2004/0015582 A1 | * | 1/2004 | Pruthi ............................ 709/224 |
| 2006/0053156 A1 | | 3/2006 | Kaushansky et al. |

FOREIGN PATENT DOCUMENTS

| | | |
|---|---|---|
| GB | 2328043 A | 2/1999 |
| WO | WO 9724841 A3 | 7/1997 |
| WO | WO0011619 A | 3/2000 |
| WO | WO0107979 A | 2/2001 |
| WO | WO 0139435 A2 | 5/2001 |

OTHER PUBLICATIONS

Final Office Action mailed Jan. 6, 2010 from U.S. Appl. No. 11/059,908.

Office Action mailed Mar. 25, 2010 from U.S. Appl. No. 11/379,045.

Arnold, et al., "An approach for the interoperation of web-distributed applications with a design model" Automation in Construction, Elsevier Science Publishers, Amsterdam, NL, vol. 8, No. 3, Feb. 1, 1999, pp. 291-303, XP004161221 ISSN: 0926-5805.

Cisco, "Cisco 3200 Mobile Access Routers", 2 pages, Copyright 1992-2002 Cisco Systems, Inc., URL: www.cisco.com/warp/public/cc/pd/rt/ps272/.

"Cisco, ""Cisco 3200 Mobile Access Routers Product Literature""", 2 pages, Copyright 1992-2002 Cisco Systems, Inc., URL: www.cisco.com/warp/public/cc/pd/rt/ps272/prodlit/index.shtml".

Preliminary Examination Report from International Application No. PCT/US02/15163 dated Mar. 27, 2003.

International Search Report from International Application No. PCT/US03/024319 dated Aug. 23, 2004.

Written Opinion from International Application No. PCT/US03/024319 dated Dec. 29, 2005.

Preliminary Examination Report from International Application No. PCT/US03/024319 dated Mar. 22, 2006.

International Search Report from International Application No. PCT/US02/15164 dated Jul. 12, 2002.

Preliminary Examination Report from International Application No. PCT/US02/15164 dated Feb. 26, 2004.

"Dierks, et al., ""The TSL Protocol, Version 1.0""", Certicom, Jan. 1999, 57 pagesURL: www.ietf.org/rfc/rfc2246.txt".

Freier, Alan, et al., "The SSL Protocol, Version 3.0," Netscape Communications, Nov. 18, 1996, 47 pages URL: http://wp.netscape.com/eng/ss13/draft302.txt.

Gray et al., "Data Cube: A Relational Aggregation Operator Generalizing Group by, Cross Tab, and Sub-Totals", Data Engineering, 1996, pp. 152-159.

Pairceir et al., "Discovery of Multi-Level Rules and Exceptions From a Distributed Database", Proceedings of the sixth ACM SIGKDD International Conference on Knowledge Discovery and Data Mining, 2000, pp. 523-532.

PTI Traders Glossary-A, Internet Waybackmachine, Apr. 26, 2001.

Spanos, "Statistical Foundations of Econometric Modelling", Cambridge University Press, 1986, pp. 7, 8, 18, 190, 131, 462.

W3C, Simple Object Access Protocol (SOAP) 1.1, May 2000.

Office Action dated May 12, 2006 from Utility Patent No. 7,45,1110.

Office Action dated Dec. 18, 2006 from Utility Patent No. 7,451,110.

Office Action dated Sep. 7, 2007 from Utility Patent No. 7,451,110.

Office Action dated Oct. 6, 2004 from Utility Patent No. 7,124,299.

Office Action dated Oct. 19, 2005 from Utility Patent No. 7,124,299.

Office Action dated Apr. 22, 2005 from Utility Patent No. 7,124,299.

Office Action dated Mar. 17, 2009 from Continuation U.S. Appl. No. 11/549,880.

Office Action dated Sep. 10, 2004 from Utility Patent No. 7,039,034.

Office Action dated May 24, 2005 from Utility Patent No. 7,039,034.

Office Action dated Oct. 30, 2008 from Continuation-in-Part U.S. Appl. No. 11/379,045.

Office Action dated Aug. 6, 2009 from Continuation-in-Part U.S. Appl. No. 11/379,045.

Office Action dated Feb. 24, 2004 from Utility Patent No. 6,874,089.

Office Action dated Oct. 6, 2004 from Utility Patent No. 6,874,089.

Office Action dated Jun. 24, 2008 from Continuation U.S. Appl. No. 10/977,399.

Office Action dated Mar. 17, 2009 from Continuation U.S. Appl. No. 10/977,399.

Office Action dated Jul. 22, 2008 from Continuation-in-Part U.S. Appl. No. 11/059,908.

Office Action dated Apr. 1, 2009 from Continuation-in-Part U.S. Appl. No. 11/059,908.
Office Action dated Nov. 2, 2004 from Utility Patent No. 7,464,154.
Office Action dated Jun. 2, 2005 from Utility Patent No. 7,464,154.
Office Action dated Jan. 18, 2006 from Utility Patent No. 7,464,154.
Office Action dated Sep. 13, 2006 from Utility Patent No. 7,464,154.
Office Action dated May 21, 2007 from Utility Patent No. 7,464,154.
Office Action dated Feb. 2, 2009 from Canadian Patent Application No. 2,446,753.
Office Action dated Jan. 4, 2007 from Indian Patent Application No. 487/DELNP/2005.
Office Action dated Jun. 2, 2009 from Israel Patent Application No. 166660.
Supplemental Search Report dated Jun. 2, 2009 from European Patent Application No. 02729199.6.
Office Action dated Oct. 9, 2008 from European Patent Application No. 02771835.
Berners-Lee, et al., "RFC 1866: Hypertext Markup Language—2.0", Nov. 1995.
Fielding, et al., "Hypertext Transfer Protocol—HTTP/1.1: HTTP Working Group Internet Draft", May 2, 1986.
Geng-Sheng Kuo et al., "Predictable Timestamp Under Synchronized Clocks in a Network", Information Theory, 1994 Proceedings, p. 68, 1994 IEEE International Symposium, Jun. 27-Jul. 1, 1994.
Microsoft, Web Services Security Addendum, Version 1.0, Aug. 2002.
Pei-Yih Ting, "A Temporal Order Resolution Algorythm in the Multi-Server Time Stamp Service Framework", Advanced Information Networking and Applications, AINA 2005, 19th Conference on vol. 2, pp. 445-448, Mar. 28-30, 2005.
Chou-Chen Yang et al., Cryptanalysis of Security Enhancement for the Timestamp-based Password Authentication Scheme Using Smart Cards, Consumer Electronics, IEEE Transactions on vol. 50, Issue 2, pp. 578-579, May 2004.
http://www.javaworld.com/javaworld/jw-03-2000/jw-0331-ssj-jspxml13p.html.
International Preliminary Examination Report from International Application No. PCT/US02/15163 dated Mar. 27, 2003.
Office Action from U.S. Appl. No. 09/861,264 dated Oct. 6, 2004.
Office Action from U.S. Appl. No. 09/861,264 dated Apr. 22, 2005.
Final Office Action from U.S. Appl. No. 09/861,264 dated Oct. 19, 2005.
Notice of Allowance from U.S. Appl. No. 09/861,264 dated Jul. 6, 2006.
International Search Report from International Application No. PCT/US02/15163 dated Jul. 12, 2002.

* cited by examiner

SYSTEM, METHOD AND COMPUTER PROGRAM PRODUCT FOR AUDITING XML MESSAGES IN A NETWORK-BASED MESSAGE STREAM

CROSS-REFERENCES TO RELATED APPLICATIONS

This application is a continuation of U.S. application Ser. No. 09/861,264, filed May 18, 2001 which is hereby incorporated by reference herein in its entirety.

FIELD OF THE INVENTION

This invention relates to document security, and more particularly, relates to verification and authentication of electronic messages.

BACKGROUND OF THE INVENTION

As enterprises increasingly move their operations from the paper world to the electronic one, they lose critical capabilities of the old paper-based infrastructure. With paper records generated at each stage in a transaction, there was a natural record of the events. This paper trail provided a number of critical benefits including proof that the transaction occurred as specified at a particular time, an automatic backup of documents at each stage of the transaction, and the ability to file documents in the most appropriate manner or even duplicate them and place them in more than one file at once.

By contrast, when enterprises carry out transactions electronically, they lose all these benefits due to the following factors. First, because electronic documents are easily and undetectably modified, it's far easier to tamper with audit logs. Second, employees often incorrectly modify transactions and save them. Once this occurs, it is often extremely difficult to recover the original transaction, leading to accounting irregularities. Third, documents are stored by whatever program created them in whatever format that program uses.

While the first wave of computerization of business process removed the benefits of a paper infrastructure, the rise of XML-based Internet business processes allows enterprise to reclaim them. Once transactions occur over the Internet, it becomes possible to capture them in a separate device that then provides long term secure verification of and access to the message content. The barriers to performing this kind of capture and analysis include:

- Detecting XML messages and extracting them from the surrounding network traffic.
- Extracting the XML data from the underlying transport.
- Providing high enough throughput under high message loads.
- Maintaining a tamperproof log of all data recorded.
- Accurately determining the time of processing in order to provide reliable auditing.

SUMMARY OF THE INVENTION

A system, method and computer program product for auditing a message in a message stream are disclosed. Messages in a message stream are captured including at least one message in an extensible markup language (XML) format. Each message in the XML format is then extracted from the captured messages and has a timestamp applied thereto. Each timestamped message in the XML format is then stored in a memory.

In one aspect of the present invention, the message stream may include a plurality of messages using a variety of protocols. In another aspect, the timestamp may include a digital signature. In a further aspect, the memory may comprise a optical storage medium or a write once storage medium. In an additional aspect, the timestamped message in the XML format may be encrypted prior to storage in the memory.

In one embodiment of the present invention, the captured messages may be parsed to identify each message in the XML format for extraction. In an another embodiment, the message stream may be carried out over a communication path having one or more segments and where messages are captured at each segment. In such an embodiment, the captured messages may then be transmitted from each segment to an aggregation module prior to extraction of the messages in the XML format. In a further embodiment, a report relating to the captured messages may be generated. In an additional embodiment, the message stream may transverse a security boundary having first and second sides where messages on the first side of the security boundary are in an encrypted format and messages on the second side of the security boundary are in an encrypted format. In this embodiment, an encrypted version of each message in the XML format may be captured, extracted, and timestamped on the first side of the security boundary while a plaintext version of each message in the XML format is captured, extracted, and timestamped on the second side of the security boundary. As a further option, the encrypted and plaintext version of each message in the XML format may then be correlated to detect any changes between the versions of the respective message.

DETAILED DESCRIPTION

Figure 1:
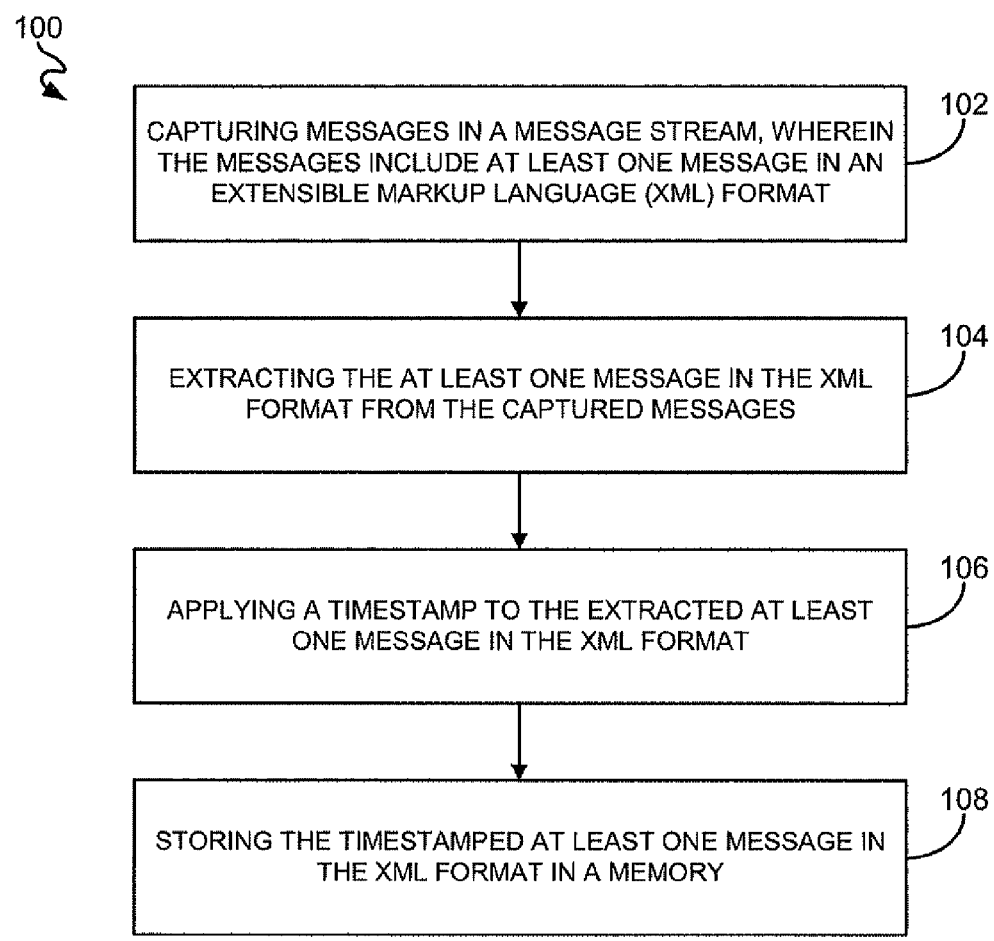
FIG. 1 is a flowchart of a process for auditing an extensible markup language (XML) message in a message stream in accordance with an embodiment of the present invention.

FIG. 1 is a flowchart of a process 100 for auditing an extensible markup language (XML) message in a message stream in accordance with an embodiment of the present invention. Messages in a network-based message stream are captured in operation 102 including at least one message in an XML format. Each message in the XML format is then extracted from the captured messages in operation 104 and has a timestamp applied thereto in operation 106. Each timestamped message in the XML format is then stored in a memory in operation 108.

In one aspect of the present invention, the message stream may include a plurality of messages using a variety of packet-based communication protocols, packaging standards, transports and formats such as, for example, XML, Transmission Control Protocol (TCP/IP), Hypertext Transfer Protocol (HTTP), File Transfer Protocol (FTP), Simple Mail Transfer Protocol (SMTP), Serial Line Internet Protocol (SLIP), User Datagram Protocol (UDP), Internetwork Packet Exchange (IPX) Simple Object Access Protocol (SOAP), Multi-Purpose Internet Mail Extensions (MIME), Java Message Service (JMS). In another aspect, the timestamp may include a digital signature. In a further aspect, the memory may comprise a optical storage medium such as a CD-ROM or DVD-ROM. In an additional aspect, the timestamped message in the XML format may be encrypted prior to storage in the memory.

In one embodiment of the present invention, the captured messages may be parsed to identify each message in the XML format for extraction. In an another embodiment, the message stream may be carried out over a communication path (i.e., network) having one or more network segments and where messages are captured at each network segment. In such an embodiment, the captured messages may then be transmitted from each network segment to an aggregation module prior to extraction of the messages in the XML format.

In a further embodiment of the present invention, a report (e.g., a daily digest) relating to the captured messages may be periodically generated and then transmitted to a remote location to help prevent rollback attacks. In an additional embodiment, the message stream may transverse a security boundary such as, for example, a firewall having first and second sides where messages on the first side of the security boundary are in an encrypted format and messages on the second side of the security boundary are in an encrypted format. In this embodiment, an encrypted version of each message in the XML format may be captured, extracted, timestamped, and stored on the first side of the security boundary while a plaintext version of each message in the XML format is captured, extracted, timestamped, and stored on the second side of the security boundary. As a further option, the encrypted and plaintext version of each message in the XML format may then be correlated to detect any changes between the versions of the respective message.

The process set forth in FIG. 1 requires an understanding of the complete process of interception and analysis including:

1. Capturing—The artifact captures all of the message traffic on the wire.
2. Decoding—The artifact extracts the XML message traffic from the message stream and determines to the greatest extent possible the transaction to which it corresponds.
3. Timestamping—The artifact must apply a tamperproof timestamp to the message.
4. Archiving—The artifact stores the message to non-volatile media for future access.

Because the data is generated and processed at a large number of different machines, it may be impractical to modify each program in use. One reasonable procedure is to have a network device that captures the data as it traverses the network. Note that this may require some changes in the network topology to deal with switches.

In a preferred embodiment, the system incorporates an XML message decoder capable of recognizing various kinds of messages. The requirement here is to reassemble the TCP stream and then determine what kind of message is being transmitted. The message is then parsed at least enough to determine message identifiers—if any. This may also necessitate pluggable protocol parsing modules.

Once the messages have been captured, they are timestamped and stored. The timestamps should be tamperproof. One approach would simply be to have a very large hard drive which is tamperproof. Another approach is to use a digital signature on the data and then store the signed messages on an insecure medium.

In should be noted that the device may create a potentially adversarial problem/relationship with the customer in the situation where the customer wishes to change a message and then reinsert it into the audit trail. A number of technical countermeasures are available to solve this problem. However, it is recommended that the device contain a trusted time source and protect its private key such as, for example, by containing it in a physically tamperproof module. It should also be noted that a single audit device may not be able prevent an attacker from presenting bogus data to the device during the capture phase. For instance, an attacker might place the capture device on a separate network segment and feed it modified versions of each message. One suitable countermeasure is to have two audit devices, one that operates on a secure network segment and one that operates on an unsecure network segment, then correlate the message traffic sent over the two segments.

Figure 2:
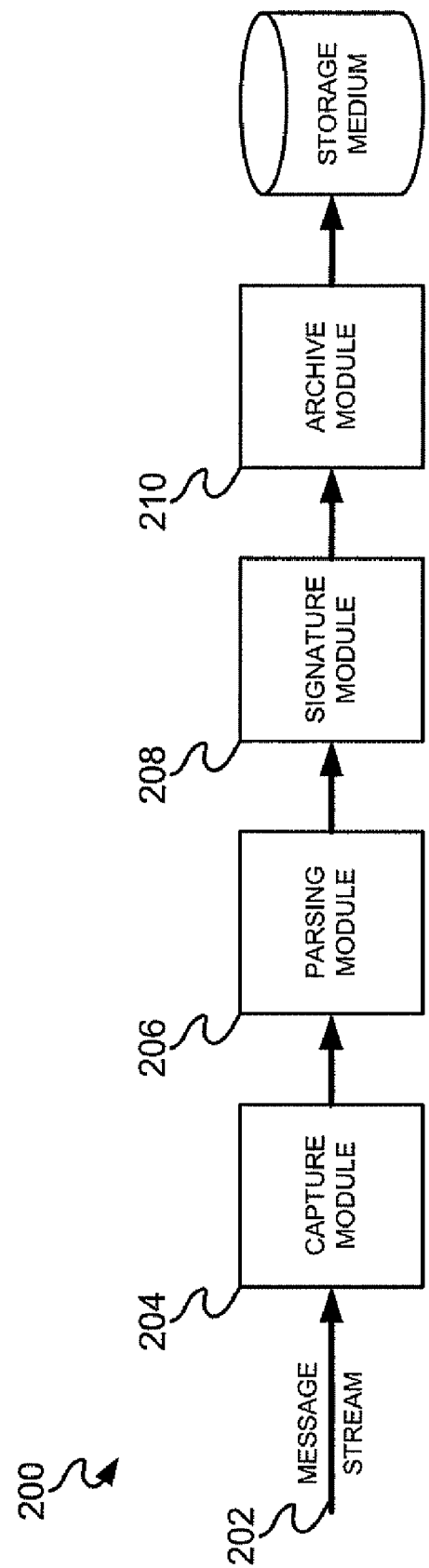
FIG. 2 is a schematic diagram of a system for carrying out a process for auditing an XML message in a network-based message stream in accordance with an embodiment of the present invention.

FIG. 2 is a schematic diagram of a system 200 for carrying out a process for auditing an XML message in a network-based message stream 202 in accordance with an embodiment of the present invention. This system comprises four separate components including a capture module 204, a parsing module 206, a signature module 208, and a storage module 210 (also referred to as an archive module).

In closer detail, the capture module 204 serves to capture messages in a message stream 202 traversing a network. In a preferred embodiment, the capture module may run on a commercial CPU running a general purpose operating system such as NetBSD. Capture may be possible in at least two ways. For low-load situations, the capture module may use a Berkeley Packet Filter (BPF) to capture all Ethernet traffic and reassemble it in a user space. For high load situations, an enhanced operating system kernel may be utilized. The modification to the kernel allows a socket option that suppresses the output functions. As far as the application is concerned, the kernel accepts connections on a given socket but, preferably, it never transmits. The application then issues read, but not write, commands on the socket to read the application data. In one embodiment, the capture module may include a TCP/IP reassembler to reassemble captured TCP packets into application level message.

Figure 3:
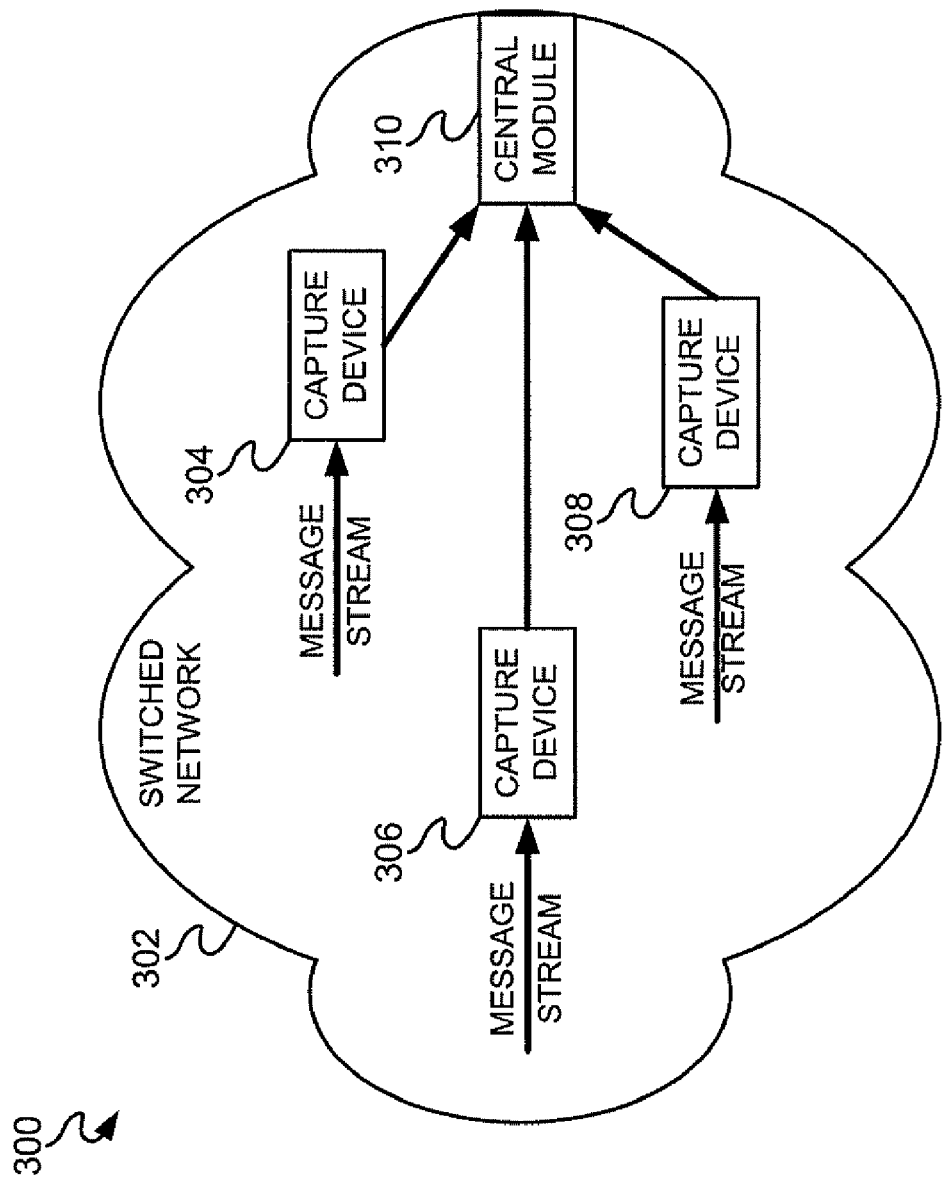
FIG. 3 is a schematic representation of system for auditing XML messages in a switched network in accordance with an embodiment of the present invention.

FIG. 3 is a schematic representation of system 300 for auditing XML messages in a switched network 302 in accordance with an embodiment of the present invention. In a switched network, it may be necessary to have multiple capture devices 304, 306, 308, with one capture device per network segment. The capture devices 304, 306, 308, then transmit their results back to a central module/device 310 which includes for at least one of the other three remaining modules (e.g., at least one of the parsing module, the signature module, and storage module).

Once the module captures messages, the captured messages must be parsed by the parsing module 206 to find their inner XML message for extraction (by the parsing module as well). This may easily be done on the same machine on which the capture module resides, but in the multiple capture device situation (see FIG. 3), one central aggregation and parsing point may be preferred and therefore, the parsing module reside on the central module/device 308. Like the capture module 204, the parsing module 206 may be run on commodity hardware.

Figure 4:
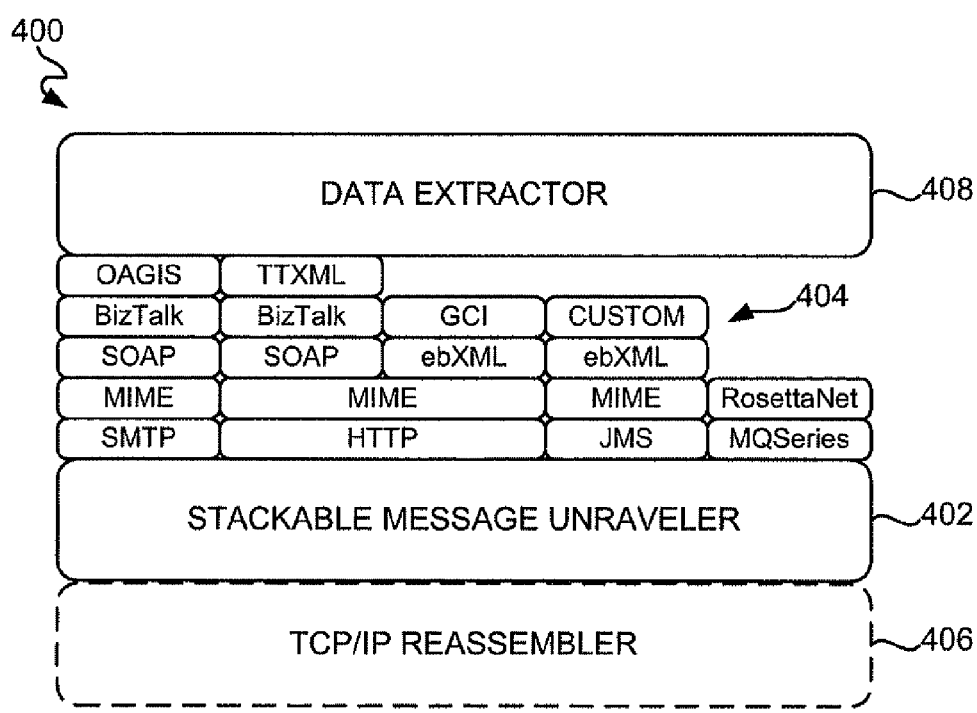
FIG. 4 is a schematic representation of components of a parsing module in accordance with an exemplary embodiment of the present invention.

FIG. 4 is a schematic representation of components of a parsing module 206 in accordance with an exemplary embodiment of the present invention. In order to extract XML messages from the captured messages, the parsing device needs to first figure out if the captured messages contain XML messages. Because these messages may flow over many application level transports, use many different packaging standards, and use many different XML message protocols, etc., getting at this data requires a stackable message unraveler 402. For each potential combination of layers with an XML message at the top, the capture device has a registered stack of pluggable unravelers 404. As illustrated in FIG. 4, some examples of pluggable unravelers 404 that may be plugged into the stack include: an Open Applications Group Integration Specification (OAGIS) pluggable unraveler, a BizTalk pluggable unraveler, a SOAP pluggable unraveler, a MIME pluggable unraveler, a SMTP pluggable unraveler, a TTXML pluggable unraveler, a GCI pluggable unraveler, an Electronic Business XML (ebXML) pluggable unraveler, a JMS pluggable unraveler, a RosettaNet pluggable unraveler, a MQSeries pluggable unraveler, as well as customizable pluggable unravelers. Also, as option, the parsing module—instead of the capture module—may include the TCP/IP reassembler 406 to reassemble TCP packets captured by the capture module into application level message prior to parsing and extraction.

In operation, as messages come in from the TCP reassembler, the unraveling framework 402 and 404 examines the application header to see if it supports that header. It then examines the next level of header and proceeds in this manner until it either finds an unrecognized header or finds the top-level XML message, which it passes on to a data extractor 408 which extracts the detected XML message.

The signature module 208 is utilized to applied a timestamp to each XML message extracted by the parsing module 206. The signature module preferably connects directly to the parsing module. In a preferred embodiment, the signature module does not run on commodity hardware and instead runs on a special a tamperproof device containing: a secure time source and secure key storage.

There are at least three possible levels of secure timestamping. A low-level solution has a master clock in a separate network device and individual clocks in each capture device. In one embodiment, the master clock may be a radio clock in a tamperproof network device that gets its time from the ordinary government time frequencies. The individual clocks may be high quality quartz clocks in the capture devices. At a configurable interval, the master clock establishes a secure channel to the capture devices and interrogates their individual clocks. If an individual clock has drifted beyond a configurable drift window, the master clock resets it. If the individual clock has a time that is in a configurable danger window, the master clock assumes an attack is under way and sounds an alarm to the management console. In a medium-level solution, each capture device may have its own radio clock in a tamperproof housing. In a really high-level device, each capture device may have its own atomic clock. In all cases, the secure time source preferably connects to the secure key storage and signature module in a tamperproof fashion.

Essentially, the signature module takes in messages and outputs timestamps. A timestamp is a signed token. In a preferred embodiment, the signature covers: the digest of the message, the time, a counter which increases by one each signature, and an encrypted digest of all previous messages.

The archive module 210 stores each message to long term storage along with the associated timestamp. Preferably, the long term storage may be write only medium such as, for example, a large hard drive backed by a DVD writer. Messages may be stored both sequentially and indexed by as much indexing information as the parsing module can extract from the message. It should be noted that the security of the system does not rely on the write-only properties of the DVD though that may provide additional backup. DVD is merely a cheap high capacity archival storage medium. The archive module 210 may be run on commodity hardware. In one embodiment, the archive module 210 may runs on the same machine as the parsing module 208.

As a further security measure, the archive module can also send a daily digest of all captured messages (provided by the capture module(s)) to a remote location. This helps to prevent any rollback attack.

Optionally, the archive module can encrypt the data before committing it to long term storage. Since public key technology is available, we can encrypt the data under a key not available to any of the online units, and stored in a data key available only to a limited number of authorized users. This allows turnkey auditability without any long term exposure of the data.

It's becoming increasingly common for electronic commerce operations to be performed over Secured Socket Layer (SSL). In such a case there may be four possibilities:
1. Encryption performed on server, private key available;
2. Encryption performed on server, private key unavailable;
3. Encryption performed on accelerator, private key available; and
4. Encryption performed on accelerator, private key unavailable.

In cases 1 and 3, one can record both the plaintext and the ciphertext and prove that they match. In case 2, one can record the ciphertext only and then demonstrate the plaintext at some later time if provided with the private key. In case 4, one can record both the plaintext and the ciphertext but cannot prove that they match without the private key. As a special case, if the client cooperates with the audit machine, it can supply the SSL PreMaster Secret, thus enabling decryption even in case 4.

Figure 5:
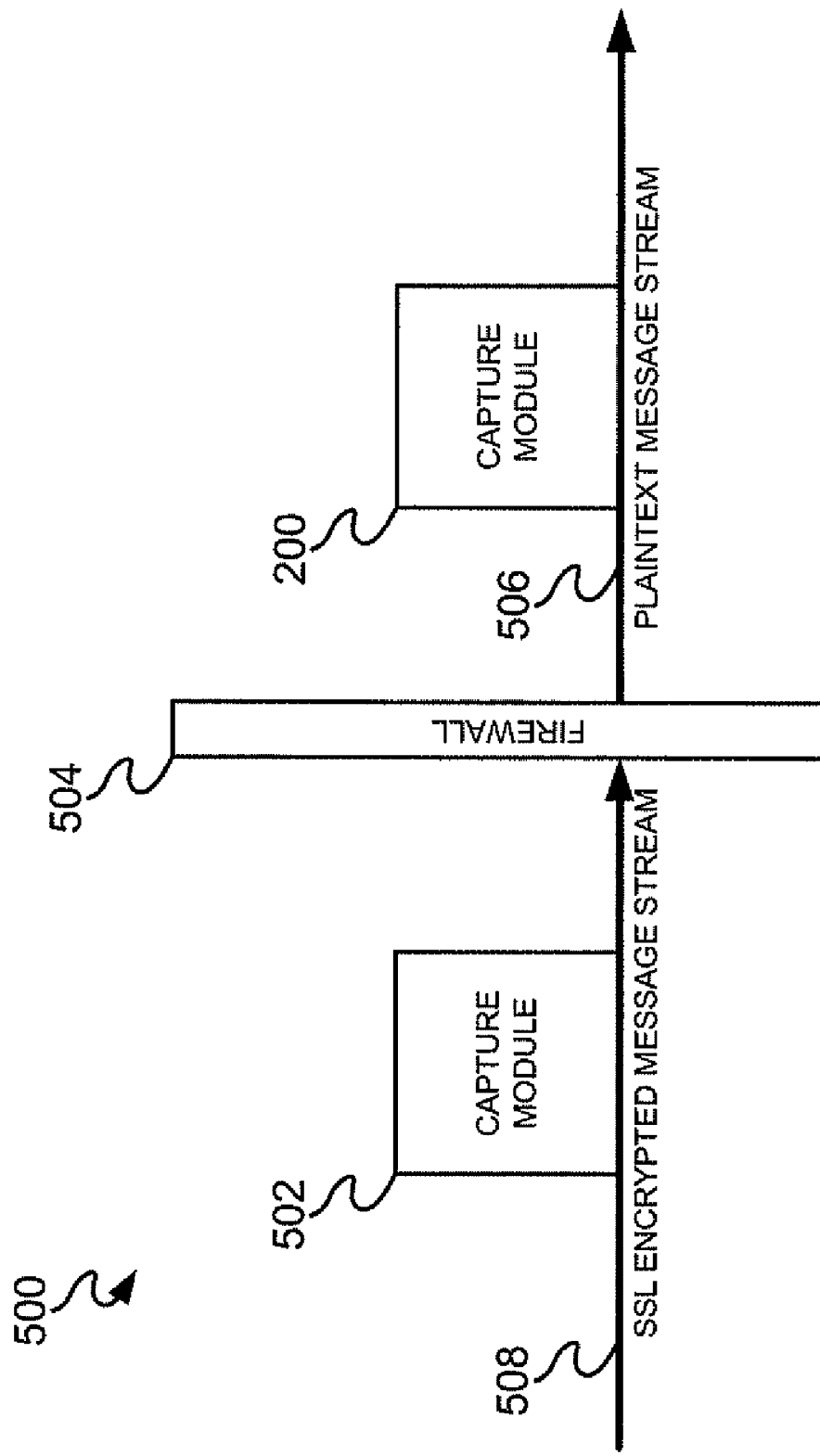
FIG. 5 is a schematic representation of an embodiment of a system capable of carrying out multiple correlated capture in accordance with an embodiment of the present invention.

FIG. 5 is a schematic representation of an embodiment of a system 500 capable of carrying out multiple correlated capture in accordance with an embodiment of the present invention. As a countermeasure to attacks where the customer forges traffic to the device 200 there is a second recording device 502 (similar to device 200) outside the firewall 504 or even on the ISP's side of the network, e.g., between the customer router and the customer's line. So there are two sets of recorded data: one of the plaintext messages inside the enterprise network boundary (see plaintext message stream 506) and one of the SSL encrypted messages outside the enterprise network boundary (see SSL encrypted message stream 508). These can be correlated when it becomes necessarily to prove a given piece of a transaction.

Typically, enterprises use an SSL accelerator to decrypt SSL traffic once it crosses the enterprise network boundary. Most of these accelerators preserve the original source IP and port when they decrypt the traffic. Therefore, in order to match up SSL and plaintext data streams a piece of analysis software simply matches up the socket connections. This software can make these matches without having the keying material. Note that this correlation isn't proof of identity, though rough traffic analysis based on record length can provide a certain level of assurance. However, if there is a serious dispute, the a parties can reveal their private keys and with the software can take the correlated streams and then decrypt the SSL stream to demonstrate that they are the same.

In one embodiment, the modules (other than the signature module) may be generic motherboards in 19" rack mount chasses. As previously noted, the storage module may need a large drive and some sort of permanent storage device such as a DVD writer or a tape drive. The signature module is preferably specially constructed to be tamperproof. The canonical piece of such technology is the BBN SafeKeyper. In such an embodiment, the signature module should connect directly to a dedicated port on the parsing module. All other modules may simply have standard Ethernet ports.

Figure 6:
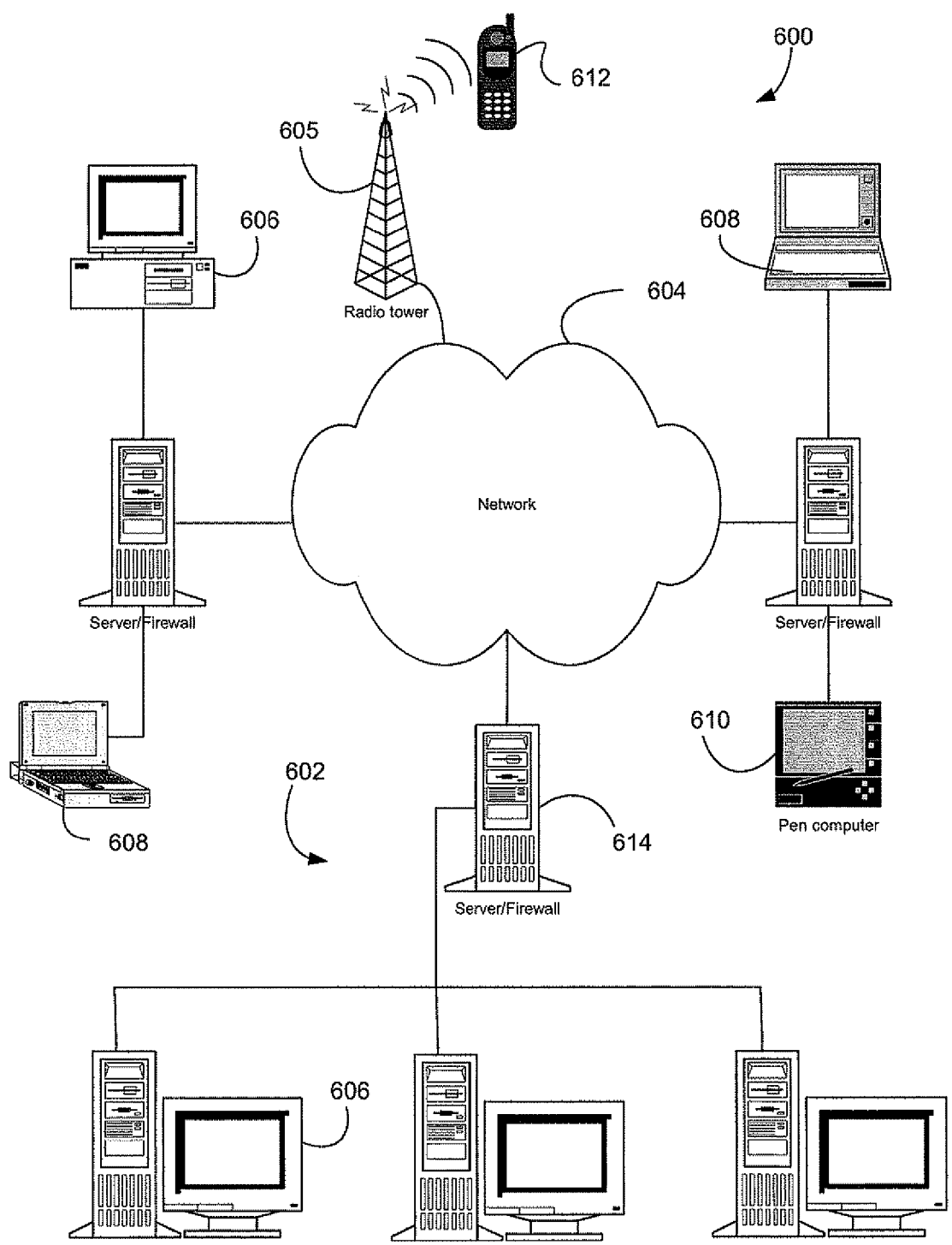
FIG. 6 is a schematic diagram of an illustrative system with a plurality of components in accordance with an embodiment of the present invention.

FIG. 6 illustrates an exemplary system 600 with a plurality of components 602 in accordance with one embodiment of the present invention. As shown, such components include a network 604 which take any form including, but not limited to a local area network, a wide area network such as the Internet, and a wireless network 605. Coupled to the network 604 is a plurality of computers which may take the form of desktop computers 606, lap-top computers 608, hand-held computers 610 (including wireless devices 612 such as wireless PDA's or mobile phones), or any other type of computing hardware/software. As an option, the various computers may be connected to the network 604 by way of a server 614 which may be equipped with a firewall for security purposes. It should be noted that any other type of hardware or software may be included in the system and be considered a component thereof.

Figure 7:
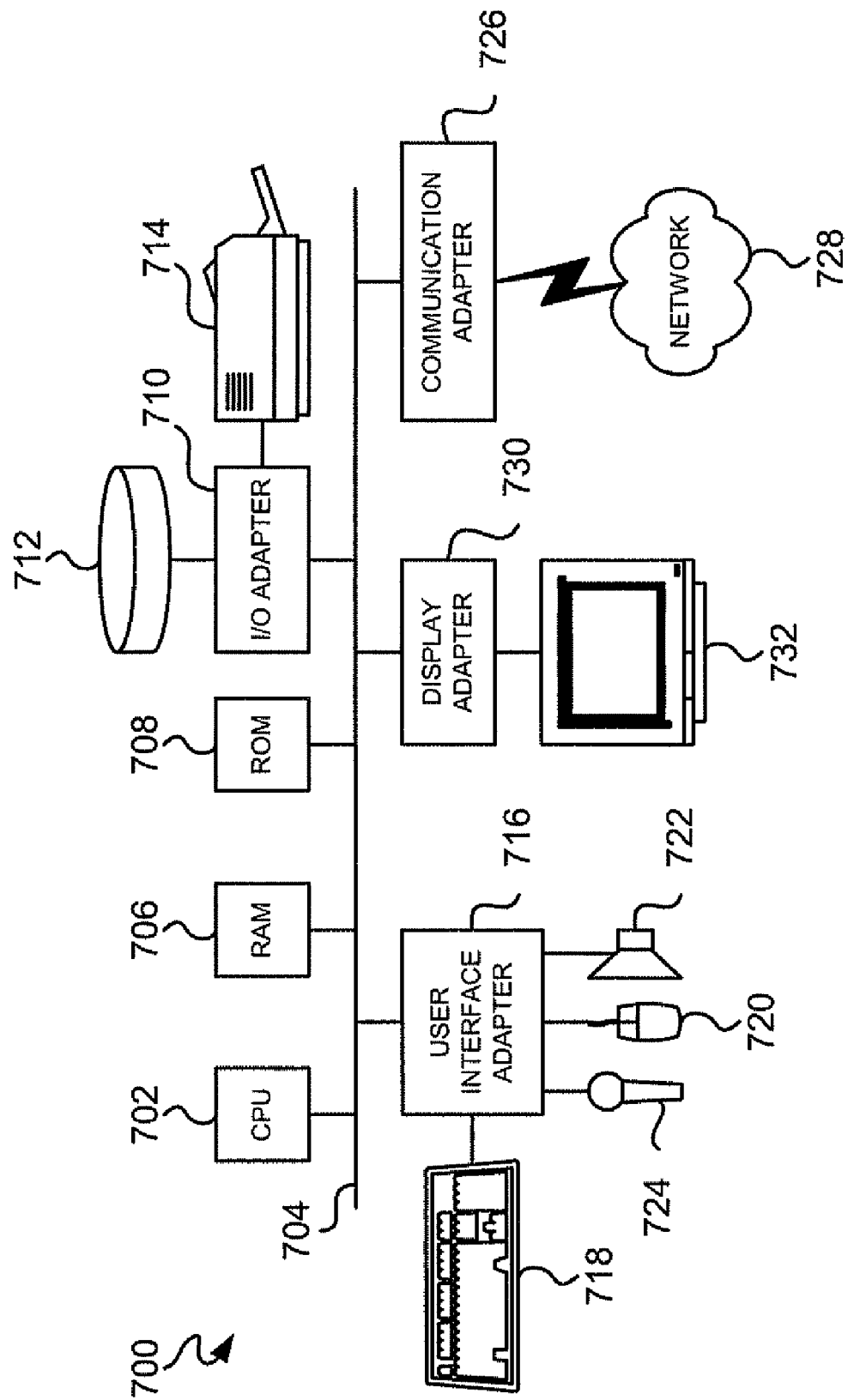
FIG. 7 is a schematic diagram of a representative hardware environment in accordance with an embodiment of the present invention.

A representative hardware environment associated with the various components of FIG. 6 is depicted in FIG. 7. In the present description, the various sub-components of each of the components may also be considered components of the system. For example, particular software modules executed on any component of the system may also be considered components of the system. FIG. 7 illustrates an illustrative hardware configuration of a workstation 700 having a central processing unit 702, such as a microprocessor, and a number of other units interconnected via a system bus 704.

The workstation shown in FIG. 7 includes a Random Access Memory (RAM) 706, Read Only Memory (ROM) 708, an I/O adapter 710 for connecting peripheral devices such as, for example, disk storage units 712 and printers 714 to the bus 704, a user interface adapter 716 for connecting various user interface devices such as, for example, a keyboard 718, a mouse 720, a speaker 722, a microphone 724, and/or other user interface devices such as a touch screen or a digital camera to the bus 704, a communication adapter 726 for connecting the workstation 700 to a communication network 728 (e.g., a data processing network) and a display adapter 730 for connecting the bus 704 to a display device 732.

Also, an article of manufacture, such as a pre-recorded disk or other similar computer program product, for use with a data processing system, could include a storage medium and program means recorded thereon for directing the data processing system to facilitate the practice of the invention. Such apparatus and articles of manufacture also fall within the spirit and scope of the invention.

A packet is the unit of data that is routed between an origin and a destination on the Internet or any other packet-switch network. When any file (e-mail message, HTML file, Graphics Interchange Format (GIF) file, Uniform Resource Locator (URL) request, and so forth) is sent from one place to another on the Internet, the Transmission Control Protocol (TCP) layer of TCP/IP divides the file into "chunks" of an efficient size for routing. Each of these packets is separately numbered and includes the Internet address of the destination. The individual packets for a given file may travel different routes through the Internet. When they have all arrived, they are reassembled into the original file (by the TCP layer at the receiving end).

Packet-switched describes the type of network in which relatively small units of data called packet are routed through a network based on the destination address contained within each packet. Breaking communication down into packets allows the same data path to be shared among many users in the network. This type of communication between sender and receiver is known as connectionless (rather than dedicated). Most traffic over the Internet uses packet switching and the Internet is basically a connectionless network.

Contrasted with packet-switched is circuit-switched, a type of network such as the regular voice telephone network in which the communication circuit (path) for the call is set up and dedicated to the participants in that call. For the duration of the connection, all resources on that circuit are unavailable for other users. Voice calls using the Internet's packet-switched system are possible. Each end of the conversation is broken down into packets that are reassembled at the other end.

Another common type of digital network that uses packet-switching is the X.25 network, a widely installed commercial wide area network protocol. Internet protocol packets can be carried on an X.25 network. The X.25 network can also support virtual circuits in which a logical connection is established for two parties on a dedicated basis for some duration. A permanent virtual circuit reserves the path on an ongoing basis and is an alternative for corporations to a system of leased line. A permanent virtual circuit is a dedicated logical connection but the actual physical resources can be shared among multiple logical connections or users.

A firewall is a set of related programs, located at a network gateway server, that protects the resources of a private network from users from other networks. (The term also implies the security policy that is used with the programs.) An enterprise with an intranet that allows its workers access to the wider Internet installs a firewall to prevent outsiders from accessing its own private data resources and for controlling what outside resources its own users have access to.

Basically, a firewall, working closely with a router program, examines each network packet to determine whether to forward it toward its destination. A firewall also includes or works with a proxy server that makes network requests on behalf of workstation users. A firewall is often installed in a specially designated computer separate from the rest of the network so that no incoming request can get directly at private network resources.

There are a number of firewall screening methods. A simple one is to screen requests to make sure they come from acceptable (previously identified) domain name and Internet Protocol (IP) addresses. For mobile users, firewalls allow remote access in to the private network by the use of secure logon procedures and authentication certificates.

Common features of firewall include logging and reporting, automatic alarms at given thresholds of attack, and a graphical user interface for controlling the firewall.

Transmission Control Protocol/Internet Protocol (TCP/IP) is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite."

Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

XML (Extensible Markup Language) is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML can be used by any individual or group of individuals or companies that wants to share information in a consistent way.

XML, a formal recommendation from the World Wide Web Consortium (W3C), is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page.

Early applications of XML include Microsoft's Channel Definition Format (CDF), which describes a channel, a portion of a Web site that has been downloaded to your hard disk and is then is updated periodically as information changes. A specific CDF file contains data that specifies an initial Web page and how frequently it is updated. Another early application is ChartWare, which uses XML as a way to describe medical charts so that they can be shared by doctors. Applications related to banking, e-commerce ordering, personal preference profiles, purchase orders, litigation documents, part lists, and many others are anticipated.

On the Internet, B2B (business-to-business), also known as e-biz, is the exchange of products, services, or information between businesses rather than between businesses and consumers.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII.). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

Secure Sockets Layer (SSL) is a commonly-used protocol for managing the security of a message transmission on the Internet. SSL uses a program layer located between the Internet's Hypertext Transfer Protocol (HTTP) and Transport Control Protocol (TCP) layers. The "sockets" part of the term refers to the sockets method of passing data back and forth between a client and a server program in a network or between program layers in the same computer. SSL uses the public-and-private key encryption system from RSA, which also includes the use of a digital certificate.

A digital signature is an electronic rather than a written signature that can be used by someone to authenticate the identity of the sender of a message or of the signer of a document. It can also be used to ensure that the original content of the message or document that has been conveyed is unchanged. Additional benefits to the use of a digital signature are that it is easily transportable, cannot be easily repudiated, cannot be imitated by someone else, and can be automatically time-stamped.

A digital signature can be used with any kind of message, whether it is encrypted or not, simply so that the receiver can be sure of the sender's identity and that the message arrived intact. A digital certificate contains the digital signature of the certificate-issuing authority so that anyone can verify that the certificate is real.

BizTalk is an industry initiative headed by Microsoft to promote Extensible Markup Language (XML) as the common data exchange language for e-commerce and application integration on the Internet. While not a standards body per se, the group is fostering a common XML message-passing architecture to tie systems together. BizTalk says that the growth of e-commerce requires businesses using different computer technologies to have a means to share data. Accepting XML as a platform-neutral way to represent data transmitted between computers, the BizTalk group provides guidelines, referred to as the BizTalk Framework, for how to publish schema (standard data structures) in XML and how to use XML messages to integrate software programs.

Simple Object Access Protocol (SOAP) is a way for a program running in one kind of operating system to communicate with a program in the same or another kind of an operating system by using the World Wide Web's Hypertext Transfer Protocol and its Extensible Markup Language (XML) as the mechanisms for information exchange. Since Web protocol are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response. SOAP was developed by Microsoft, DevelopMentor, and Userland Software and has been proposed as a standard interface to the Internet Engineering Task Force (IETF). It is somewhat similar to the Internet Inter-ORB Protocol, a protocol that is part of the Common Object Request Broker Architecture. Sun Microsystems' Remote Method Invocation is a similar client/server interprogram protocol between programs written in Java.

An advantage of SOAP is that program calls are much more likely to get through firewall servers that screen out requests other than those for known applications (through the designated port mechanism). Since HTTP requests are usually allowed through firewalls, programs using SOAP to communicate can be sure that they can communicate with programs anywhere.

Multi-Purpose Internet Mail Extensions (MIME) is an extension of the original Internet e-mail protocol that lets people use the protocol to exchange different kinds of data files on the Internet: audio, video, images, application programs, and other kinds, as well as the ASCII handled in the original protocol, the Simple Mail Transport Protocol (SMTP). In 1991, Nathan Borenstein of Bellcore proposed to the IETF that SMTP be extended so that Internet (but mainly Web) client and server could recognize and handle other kinds of data than ASCII text. As a result, new file types were added to "mail" as a supported Internet Protocol file type.

Servers insert the MIME header at the beginning of any Web transmission. Clients use this header to select an appropriate "player" application for the type of data the header indicates. Some of these players are built into the Web client or browser (for example, all browser come with GIF and JPEG image players as well as the ability to handle HTML files); other players may need to be downloaded.

New MIME data types are registered with the Internet Assigned Numbers Authority (IANA).

MIME is specified in detail in Internet Request for Comments 1521 and 1522, which amend the original mail protocol specification, RFC 821 (the Simple Mail Transport Protocol) and the ASCII messaging header, RFC 822.

MQSeries is an IBM software family whose components are used to tie together other software applications so that they can work together. This type of application is often known as business integration software or middleware.

MQSeries consists of three products:

MQSeries Messaging, which provides the communication mechanism between applications on different platforms MQSeries Integrator, which centralizes and applies business operations rules MQSeries Workflow, which enables the capture, visualization, and automation of business processes The point of business integration is to connect different computer systems, diverse geographical locations, and dissimilar IT infrastructures so that a seamless operation can be run. IBM's MQSeries supplies communications between applications, or between users and a set of applications on dissimilar systems. It has grown in popularity as applications are made available over the Internet because of its support of over 35 platforms and its ability to integrate disparate automation systems.

An additional helpful feature is that its messaging scheme requires the application that receives the message to confirm receipt. If no confirmation materializes, the message is re-sent by the MQSeries.

Java Message Service (JMS) is an application program interface from Sun Microsystems that supports the formal communication known as messaging between computers in a network. Sun's JMS provides a common interface to standard messaging protocols and also to special messaging services in support of Java programs.

The messages involved exchange crucial data between computers—rather than between users—and contain information such as event notification and service requests. Messaging is often used to coordinate programs in dissimilar systems or written in different programming languages.

Using the JMS interface, a programmer can invoke the messaging services of IBM's MQSeries, Progress Software's SonicMQ, and other popular messaging product vendors. In addition, JMS supports messages that contain serialized Java object and messages that contain Extensible Markup Language (XML) pages.

RosettaNet is an organization set up by leading information technology companies to define and implement a common set of standards for e-business. RosettaNet is defining a common parts dictionary so that different companies can define the same product the same way. It is also defining up to 100 e-business transaction processes and standardizing them. Because RosettaNet is supported by all or most of the major companies in the IT industry, its standards are expected to be widely adopted.

RosettaNet has developed a structured four-part approach for creating what it calls Partner Interface Processes (PIPs).

Business Process Modeling examines common business procedures and defines the components of the processes.

Business Process Analysis analyzes the processes and defines a target list of desirable changes to the processes.

PIP Development establishes guidelines and documentation for the changes.

Dictionaries consist of two data dictionary: a technical properties dictionary and a business properties dictionary. Along with the RosettaNet Implementation Framework (which defines an exchange protocol for PIP implementation), the dictionaries form the basis for PIP development.

Simple Mail Transfer Protocol (SMTP) is a TCP/IP protocol used in sending and receiving e-mail. However, since it's limited in its ability to queue messages at the receiving end, it's usually used with one of two other protocols, POP3 or Internet Message Access Protocol, that let the user save messages in a server mailbox and download them periodically from the server. In other words, users typically use a program that uses SMTP for sending e-mail and either POP3 or IMAP for receiving messages that have been received for them at their local server. Most mail programs such as Eudora let you specify both an SMTP server and a POP server. On UNIX-based systems, sendmail is the most widely-used SMTP server for e-mail. A commercial package, Sendmail, includes a POP3 server and also comes in a version for Windows NT.

SMTP usually is implemented to operate over Transmission Control Protocol port 25. The details of SMTP are in Request for Comments 821 of the Internet Engineering Task Force (IETF). An alternative to SMTP that is widely used in Europe is X400.

The Hypertext Transfer Protocol (HTTP) is the set of rules for exchanging files (text, graphic images, sound, video, and other multimedia files) on the World Wide Web. Relative to the TCP/IP suite of protocols (which are the basis for information exchange on the Internet), HTTP is an application protocol.

Essential concepts that are part of HTTP include (as its name implies) the idea that files can contain references to other files whose selection will elicit additional transfer requests. Any Web server machine contains, in addition to the HTML and other files it can serve, an HTTP daemon, a program that is designed to wait for HTTP requests and handle them when they arrive. Your Web browser is an HTTP client, sending requests to server machines. When the browser user enters file requests by either "opening" a Web file (typing in a URL) or clicking on a hypertext link, the browser builds an HTTP request and sends it to the Internet Protocol address indicated by the URL. The HTTP daemon in the destination server machine receives the request and, after any necessary processing, the requested file is returned.

An embodiment of the present invention may also be written using Java, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the server. HTTP or other protocols could be readily substituted for HTML without undue experimentation. Information on these products is available in T. Berners Lee, D. Connoly, "RFC 1866: Hypertext Markup Language 2.0" (November 1995); and R. Fielding, H, Frystyk, T. Berners Lee, J. Gettys and J. C. Mogul, "Hypertext Transfer Protocol HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystems's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to Java is provided by Microsoft and ActiveX Technologies, to give developers and Web designers wherewithal to build dynamic content for the Internet and personal computers. ActiveX includes tools for developing animation, 3D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for Java without undue experimentation to practice the invention.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed:

1. A method, comprising:
capturing messages in a message stream traversing a security boundary defining at least two sides with messages being captured in the message stream on each side of the security boundary, the at least two sides including an encrypted side and a plaintext side, the messages captured on the encrypted side being encrypted and the messages captured on the plaintext side having a plaintext format;
extracting at least one message in an extensible markup language from the captured messages from at least the encrypted and plaintext sides of the security boundary to obtain a version of the extracted message from each side of the security boundary, wherein the messages are extracted by reassembling packets captured from the message stream into application level messages and identifying those application level messages that comprise top-level extensible markup language messages;

applying a timestamp to each version of the extracted message in the extensible markup language;

storing all timestamped versions of the extracted message with at least a first timestamped version of the message stored as a first set of data and at least a second timestamped version of the message stored as a second set of data; and correlating the first and second timestamped versions of the extracted message to detect changes between the two versions of the extracted message, wherein a detected change between the versions of the extracted message indicates that one of the versions has been tampered, wherein the first and second timestamped versions of the extract message are correlated by matching socket connections between the encrypted side version of the message to the plaintext side version of the message, wherein the encrypted side version of the message remains encrypted during the correlating.

2. The method of claim 1, wherein the extensible markup language is XML.

3. The method of claim 1, wherein the timestamped versions of the extracted message are stored in a write once storage medium.

4. The method of claim 1, wherein a report relating to the captured messages is generated.

5. The method of claim 1, wherein at least one timestamped version of the extracted message is encrypted prior to storage.

6. A system, comprising:

a message stream traversing a security boundary defining at least two sides, the at least two sides including an encrypted side and a plaintext side, the messages captured on the encrypted side being encrypted and the messages captured on the plaintext side having a plaintext format;

at least one capture module for capturing messages in the message stream on each side of the security boundary;

an extraction module for extracting at least one message in an extensible markup language from the captured messages from at least the encrypted and plaintext sides of the security boundary to obtain a version of the extracted message from each side of the security boundary, wherein the messages are extracted by reassembling packets captured from the message stream into application level messages and identifying those application level messages that comprise top-level extensible markup language messages;

a module for applying a timestamp to each version of the extracted message in the extensible markup language;

a storage device for storing all timestamped versions of the extracted message with at least a first timestamped version of the message stored as a first set of data and at least a second timestamped version of the message stored as a second set of data; and a module for correlating the first and second timestamped versions of the extracted message to detect changes between the two versions of the extracted message, wherein a detected change between the versions of the extracted message indicates that one of the versions has been tampered, wherein the first and second timestamped versions of the extract message are correlated by matching socket connections between the encrypted side version of the message to the plaintext side version of the message, wherein the encrypted side version of the message remains encrypted during the correlating.

7. The method of claim 6, wherein the-extensible markup language is XML.

8. The method of claim 6, wherein the storage device comprises a write once storage medium.

9. A non-transitory computer-readable storage medium containing a set of instructions that cause a computer to perform a process, the process, comprising:

capturing messages in a message stream traversing a security boundary defining at least two sides with messages being captured in the message stream on each side of the security boundary, the at least two sides including an encrypted side and a plaintext side, the messages captured on the encrypted side being encrypted and the messages captured on the plaintext side having a plaintext format;

extracting at least one message in an extensible markup language from the captured messages from at least the encrypted and plaintext sides of the security boundary to obtain a version of the extracted message from each side of the security boundary, wherein the messages are extracted by reassembling packets captured from the message stream into application level messages and identifying those application level messages that comprise top-level extensible markup language messages;

applying a timestamp to each version of the extracted message in the extensible markup language;

storing all timestamped versions of the extracted message with at least a first timestamped version of the message stored as a first set of data and at least a second timestamped version of the message stored as a second set of data; and correlating the first and second timestamped versions of the extracted message to detect changes between the two versions of the extracted message, wherein a detected change between the versions of the extracted message indicates that one of the versions has been tampered, wherein the first and second timestamped versions of the extracted message are correlated by matching socket connections between the encrypted side version of the message to the plaintext side version of the message, wherein the encrypted side version of the message remains encrypted during the correlating.

* * * * *